INVENTORS
WALTER R. KAMINSKI
RAYMOND L. ENSINGER

BY Walter Petrocko, Jr.
ATTORNEY

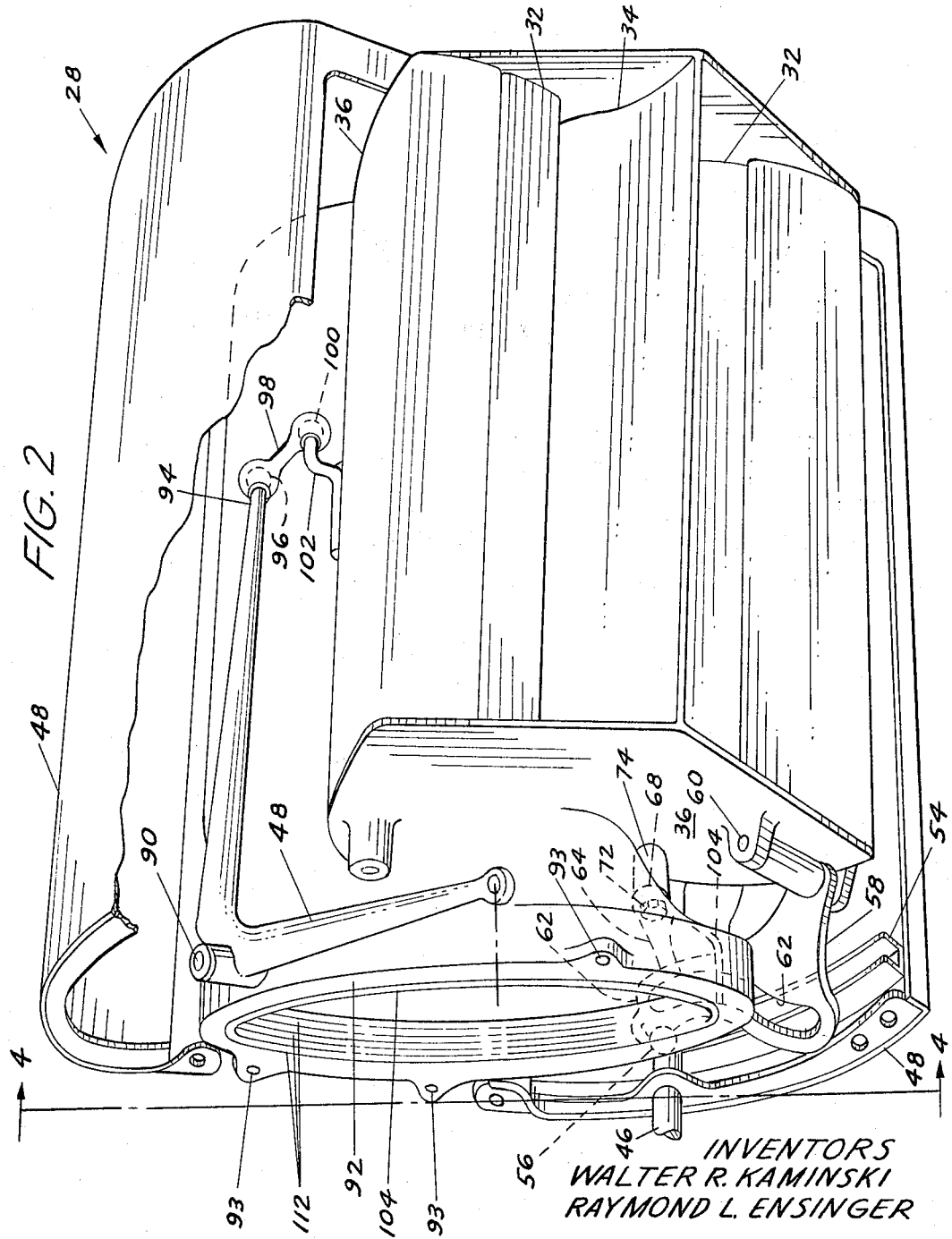

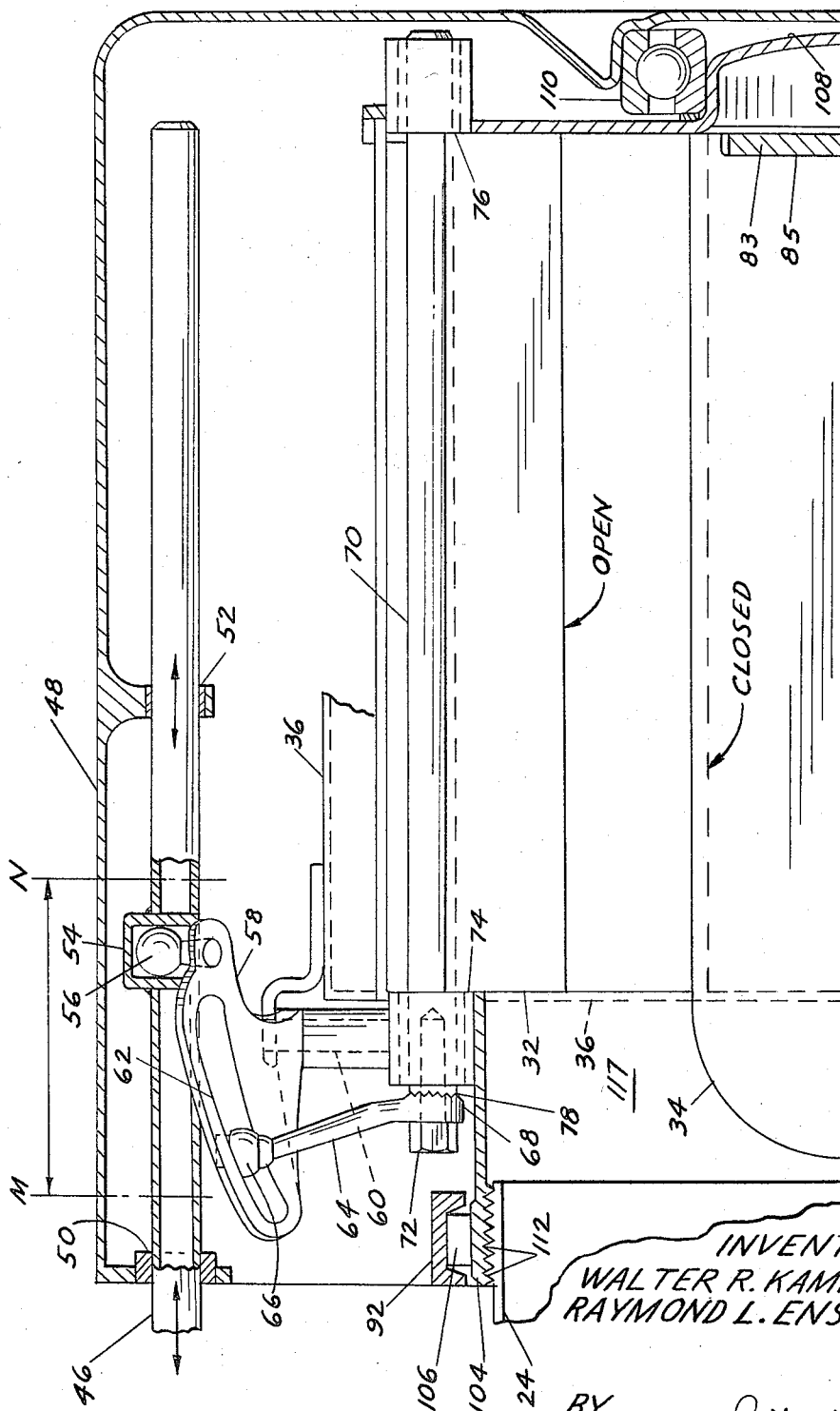

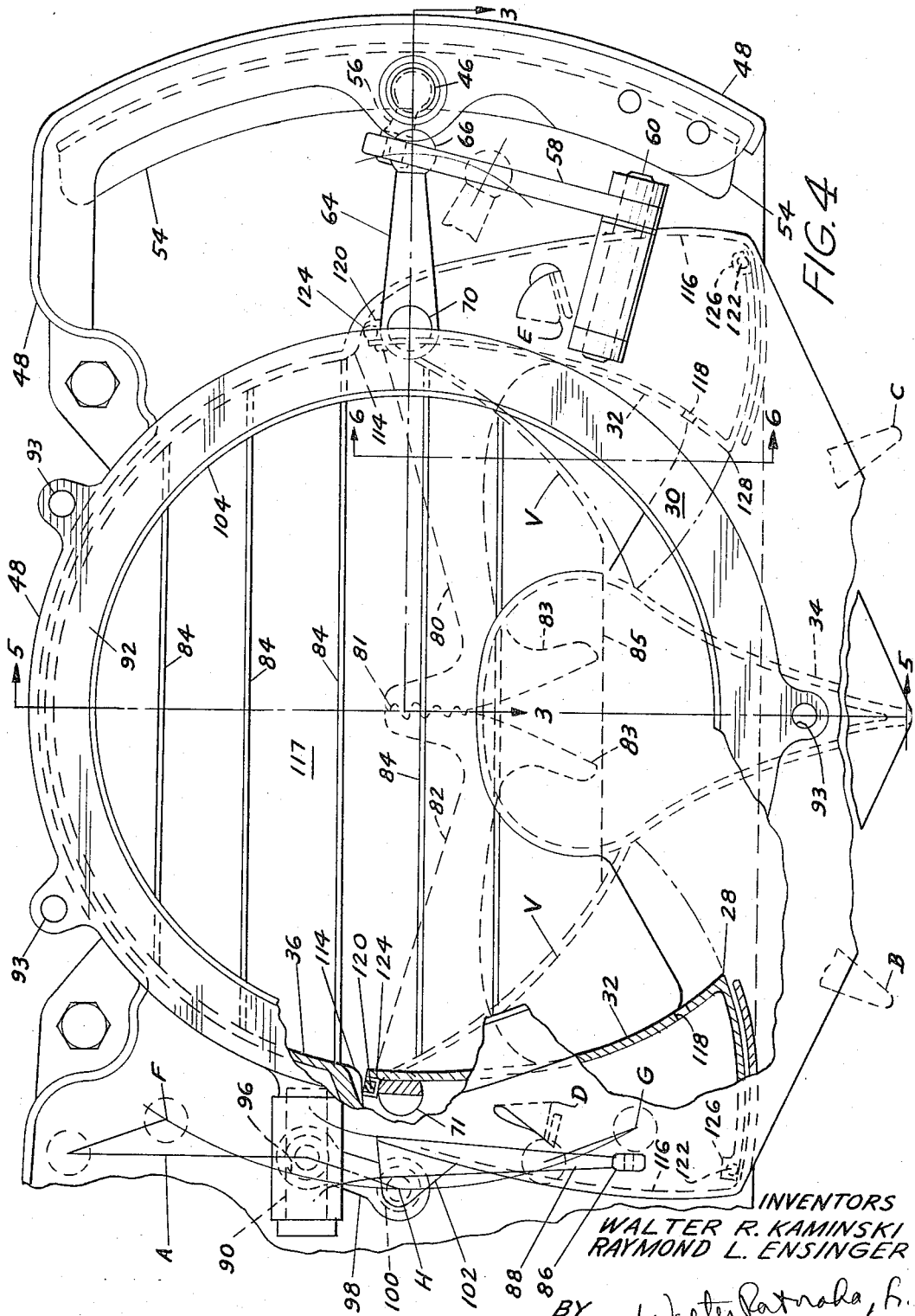

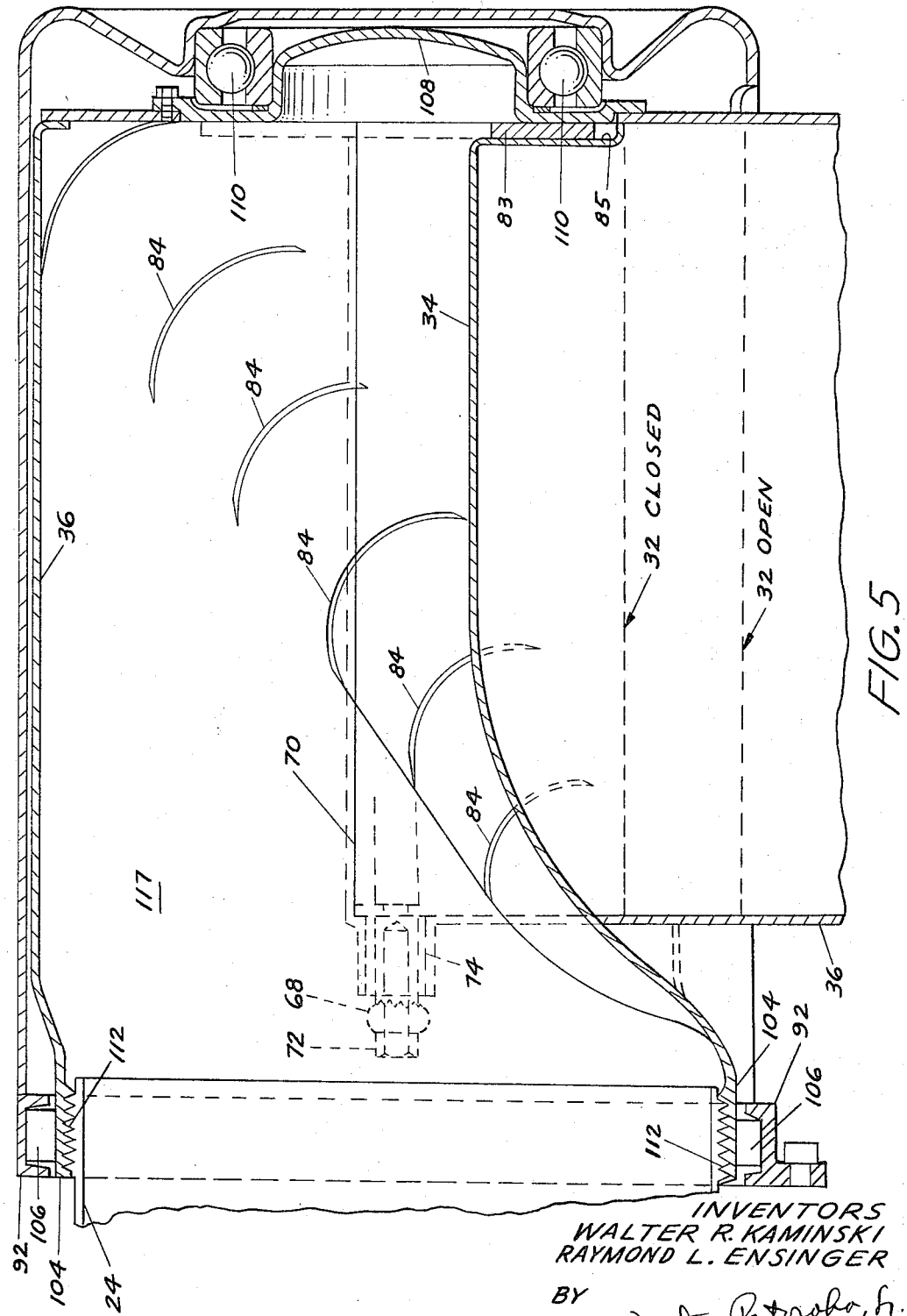

United States Patent Office 3,284,029
Patented Nov. 8, 1966

3,284,029
REACTION CONTROL VALVE
Walter R. Kaminski, Ferndale, and Raymond L. Ensinger, Detroit, Mich., assignors to Holley Carburetor Company, Warren, Mich., a corporation of Michigan
Filed Sept. 8, 1964, Ser. No. 394,986
8 Claims. (Cl. 244—52)

This invention relates generally to reaction control valves, and more particularly to a thrust vector type reaction control valve capable of independently and/or simultaneously varying the magnitude and direction of the thrust force.

Gas turbine engine powered aircraft of the vertical take-off and landing type have been proposed and experimented with in recent years. It is essential that such aircraft have means for controlling the pitch, yaw and roll attitudes thereof. Such means may comprise reaction control valves mounted at the wing tips for roll control and thrust vector type reaction control valves mounted at fore and aft fuselage positions for pitch and yaw control.

Accordingly, a primary object of this invention is to provide reaction control valve and linkage means suitable for mounting at fore and aft fuselage positions for controlling both pitch and yaw moments during the vertical take-off and landing operations of the aircraft.

A further object of this invention is to provide such means comprising a single thrust vector type reaction control valve mountable at each such position, regardless of the number of engines, through which the pilot may, either independently or simultaneously, control pitch and yaw. If desired, one valve may be employed at each position for each engine, in the case of a twin engine aircraft.

A still further object of the invention is to provide such means that is simple in construction, economical to manufacture and highly efficient in operation.

An additional object of the invention is to provide such means which eliminates all interaction between the pitch and yaw input signals.

A more specific object of the invention is to provide such means which comprises a two-dimensional isentropic wedge nozzle including a pair of aerodynamically balanced doors for area variation. Each of the doors has a balancing chamber formed on the back side thereof which is provided with a variable inlet orifice, resulting in the complete elimination of the usual aerodynamic torque associated with this type of a configuration.

Other objects and advantages of the invention will become apparent when reference is made to the following specification and the accompanying drawings wherein:

FIGURE 2 is a fragmentary perspective view of that portion of the invention shown at the rear of FIGURE 1, and identified therein by reference numeral 28;

FIGURE 3 is a fragmentary cross-sectional view taken on the plane of line 3—3 of FIGURE 4 and looking in the direction of the arrows;

FIGURE 4 is a front elevational view, in partial cross-section taken on the plane of line 4—4 of FIGURE 2 and looking in the direction of the arrows;

FIGURE 5 is a cross-sectional view taken along the plane of line 5—5 of FIGURE 4, and looking in the direction of the arrows.

Figures 1, 6:
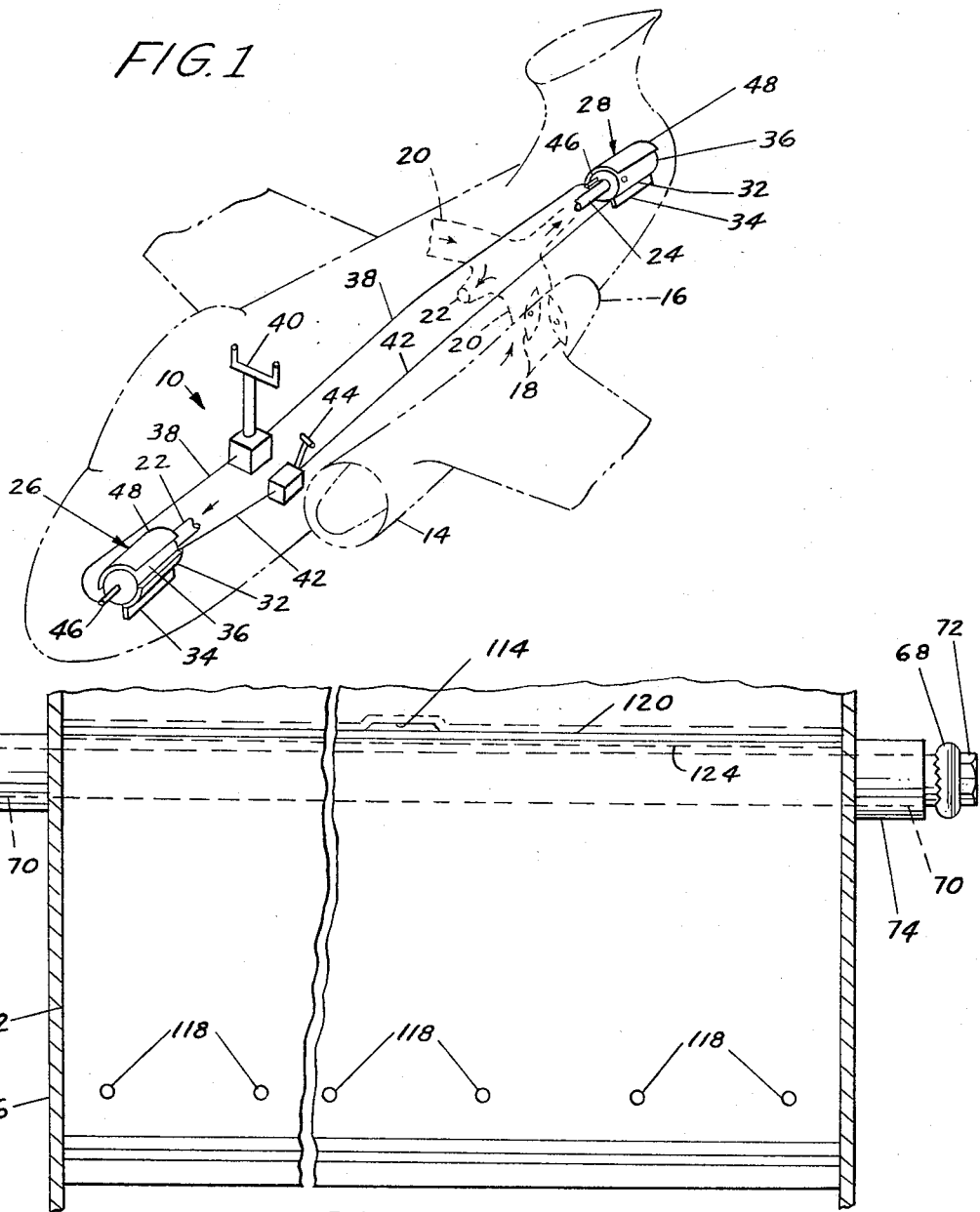
FIGURE 1 is a schematic illustration of a twin-engine aircraft embodying the invention and the controls therefor.
FIGURE 6 is a side elevational view taken along the plane of line 6—6 of FIGURE 4, and looking in the direction of the arrows.

Referring now to the drawings in greater detail, FIGURE 1 illustrates schematically a complete set of thrust vector type reaction control valves 10, as would be required for pitch and yaw control in a vertical take-off and landing vehicle, illustrated generally at 12 and having twin engines 14, one on each side of the fuselage. While a twin-engine installation is shown for purposes of illustration, it will be understood that the invention is equally applicable to single or other multiple engine vehicles.

During vertical flight the exhaust gases from either the compressors or the turbines of the two engines 14, which the horizontal flight would be discharged through the rear nozzles 16, are directed by means of diverter valves 18, controlled by the pilot, into ducts 20 which branch into passages 22 and 24. The exhaust gases which are transmitted in this manner to the identical fore and aft valves 26 and 28 are then discharged downwardly into the atmosphere, in a manner to be described later, through a pair of variable nozzles 30 (FIGURE 4) in each valve, the nozzles 30 being formed by a pair of pivotable doors 32 operable in conjunction with a hollow two-dimensional wedge 34. The shape of each nozzle 30 is varied by means of the pivotable doors 32, while the radial position thereof is varied by means of a rotatable housing 36. As illustrated in FIGURE 2, the wedge 34 also serves as a brace for the housing 36.

The doors 32 are controlled through linkage 38 connecting to the pilot's control lever 40, while the housing 36 is controlled through linkage 42 connecting to the pilot's foot pedal 44.

In the following discussion of the pitch and yaw control structures, it will be understood that the fore valves 26 and the aft valves 28 and their associated linkages are essentially identical, except possibly for dimensional variations to provide different thrust capacities at one end or the other of the fuselage; thus, similar parts are identically numbered.

Pitch control structure

Movement of the pilot control lever 40 causes reciprocating movement of the shaft 46 (FIGURES 2 and 3) within the outer valve housing 48 through bearings 50 and 52. A circular track 54, whose function will be discussed later, is fixedly secured to the shaft 46 for movement therewith between the limits M and N (FIGURE 3). A ball joint 56 is mounted within the circular track 54 and is secured to a member 58 which is pivotally attached to the inner housing 36 by a pivot 60. A cam slot 62 is formed in the member 58. An adjoining lever 64 includes a ball shaped end 66 which rides at all times in the cam slot 62. The other end 68 of the lever 64 is secured to a shaft 70 by any suitable means, such as a screw 72. The shaft 70 and a similar shaft 71 (FIGURE 4) extend from the doors 32 and are supported at their ends in bearings 74 and 76 (FIGURE 3). The end 68 and the shaft 70 may have mating serrated faces 78 formed thereon in order to eliminate slippage therebetween.

As illustrated in FIGURE 4, rotation of one door 32 in a clockwise direction about the shaft 70, by means of the linkage just described will cause the other door 32 to rotate in a counterclockwise direction through the same arc length, by virtue of the two doors 32 being interconnected by members 80 and 82. The two gear members 80 and 82 have matching teeth 81 formed at their mating surfaces which mesh together at the center of the housing 36. A lower portion 83 of each of the members 80 and 82 is free to rotate within a pocket 85 formed at the rear of the wedge 34, better seen in FIGURE 5.

Movement of the doors 32 toward and away from the two-dimensional wedge 34 (FIGURE 4) produces dual nozzles which control the pitch of the aircraft by varying the amount of upward thrust resulting from the flow of air downwardly therethrough.

The air which enters horizontally through the inlet passage 24 (FIGURE 5) is diverted 90° into a downward direction by means of the turning vanes 84 which are rigidly mounted within the housing 36.

Yaw control structure

Referring again to FIGURE 2, it may be noted that the linkage 42 is connected to an end 86 of an L-shaped lever 88 which is pivotally mounted, as by a pivot pin 90, to a stationary mounting ring 92. The latter is fixedly secured to the front of the outer housing 48, as illustrated in FIGURES 4 and 5, and may include mounting holes 93 formed thereon. The other end 94 (FIGURE 2) of the L-shaped lever 88 is rotatably inserted within the pocket 96 formed on one end of a link 98. The other end of the link 98 also includes a pocket 100 formed therein for receiving a link 102 which is fixedly secured to the housing 36, as by welding.

The housing 36 is rotatably mounted at its forward end 104 (FIGURES 2 and 5) within the mounting ring 92. As illustrated in FIGURE 5, a plurality of bearings 106 permit the free rotation of the end 104 within the mounting ring 92. The other end 108 of the housing 36 is rotatably mounted within a plurality of bearings 110 which are confined within the housing 48. A labyrinth type of seal 112 serves to prevent the escape of air between the rotatable end 104 and the inlet passage 24.

As the housing 36 rotates, it may be observed from FIGURES 2, 3 and 4, that the ball connector 56 will simply travel, in the same direction, around the track 54, without influencing the position of the doors 32 in the least, relative to the wedge 34.

Aerodynamically balanced doors

A complete balancing of the doors 32 is incorporated in the invention. This balancing of the aerodynamic torque results from the incorporation of a variable area inlet orifice 114 (FIGURES 4 and 6), which serves to modulate the pressure in a balancing chamber 116, as a function of door rotation, the chamber 116 being formed behind the doors 32. The orifice 114 is actually a groove which progressively diminishes in depth until it feathers into the outer surface, the deepest portion being located adjacent the central chamber 117 within the housing 36.

A flowing circuit through the balancing chamber 116 is assured by virtue of a plurality of openings 118 formed through the face of each of the doors 32. It may be noted, at this point, that the small percentage of total air flow which is used in the balancing circuit is still available for thrust since it discharges back into the main stream through the openings 118.

Except for the contoured groove 114 and the openings 118, it is not possible for additional air to pass into or out of the balancing chamber 116 because of seals 120 and 122 which are included at the top and bottom edges of the doors 32. The seals 120 and 122 are pushed outwardly against the inner surface of the housing 36 by means of corrugated springs 124 and 126, located behind each of the seals 120 and 122, respectively.

Operation

The operation of the pitch and yaw control valves 26 and 28 is apparent from the preceding description of the construction. However, it is deemed advisable to give an over-all summary of their operation.

Referring to FIGURE 1, one may visualize the system 10 illustrated therein as including a valve 26 located in the fore part of the vertical take-off and landing aircraft 12 and a similar valve 28 located in the aft section of the aircraft 12. The particular aircraft 12 which would employ such a system may include two gas turbine engines 14, with one fore and one aft valve receiving exhaust gases providing the thrust or reactive force from the pair of engines 14, via the passageways 20, 22 and 24. This is accomplished by virtue of there being a pair of so-called diverter valves 18 located in the aircraft 12 at the rear of each engine 14. These valves 18 co-operate to permit the exhaust gases to discharge through the rear nozzle 16 during horizontal flight operation, while blocking off the flow of the discharge gases to the passageways 20, 22 and 24.

During the vertical take-off or landing operation, the diverter valves 18 are positioned by the pilot to block off the flow of discharge gases through the rear nozzle 16 and to divert a portion of (most of the exhaust gases are used in a separate nozzle system providing the thrust to lift the aircraft, and only a portion is used for pitch and yaw control) the total exhaust flow into the duct 20, which then branches off so that the gases flow into the two main passageways 22 and 24 communicating with the valves 26 and 28, respectively. The resultant thrust at each of the valves 26 and 28 is then controlled in order to maintain the fuselage centerline of the aircraft 12 on a horizontal plane (pitch) and in the desired direction (yaw).

Pitch control is accomplished by moving the pilot control lever 40 either forward or rearward. This, of course, moves the linkage 38, which, in turn, slides the shaft 46 and its associated track 54 back and forth within the bearings 50 and 52, between limits identified by lines M and N (FIGURE 3). As the track 54 is thus moved, the ball connector 56 and its associated member 58 are pivoted about the pivot pin 60. As the member 58 moves, the ball end 66 of the lever 64 slides within the cam slot 62 of the member 58, the slot 62 is shaped such that, as the member 58 moves, the lever 64 (FIGURES 3 and 4) will be rotated about the axis of the shaft 70 and, being fixedly secured thereto by the screw 72, will cause the shaft 70 to likewise rotate. This, of course, rotates the adjoining door 32 which, in turn, through the gear members 80 and 82, serves to rotate the other door 32 in the opposite direction about its shaft 71.

Hence, the size of each of the two nozzles 30, which are formed by the doors 32 and the wedge 34, is varied. As previously mentioned, due to the contoured groove 114, the balancing chamber 116 and the openings 118, as the doors 32 are thus rotated, a complete aerodynamic balancing occurs at all positions of the doors 32 between the fully open and fully closed positions, relative to the wedge 34.

In some applications, depending upon the length of travel of the pilot's controls relative to that of the pitch control lever 46 and the L-shaped yaw lever 88, a boost actuator may be included on the airframe to provide additional power to operate the pitch and yaw levers. It should be noted, however, that, due to the improved aerodynamic balance technique described above, the boost actuator is not required to compensate for aerodynamic balance of the doors 32.

It may be noted from FIGURE 4 that when the doors 32 are fully closed against opposing sides of the wedge 34, as indicated by the dash-double-dot lines V, the seal 120, which rides across the outer edge of the groove 114, has passed the shallowest portion of the groove 114 and, hence, will thereafter prevent any further flow from the chamber 117 into the balancing chamber 116 through the groove 114. At this point, complete balancing is accomplished by means of the openings 118 serving as inlets, rather than outlets as they normally do when the groove 114 is serving as an inlet. Thus, the pressure within the chamber 116 is at all times balanced with the pressure within the main chamber 117 of the housing 36.

It may be noted from FIGURE 1 that, as the forward linkage 38 is moved toward the valve 26, the rearward linkage 38 is moved away from the valve 28. Hence, when the doors 32 of the fore valve 26 are being opened, the doors 32 of the aft valve 28 are being closed and vice versa.

When it becomes necessary to correct a yaw condition, the pilot's foot pedal 44 is depressed, thereby moving the linkage 42, as may be observed in FIGURE 2. This serves to move the end 94 of the L-shaped lever 88 through a predetermined angle, in a particular plane, about the pivot 90. This path is represented by the line A of FIGURE 4. As the end 94 thus moves, the link 98 will rotate the lever 102 (FIGURE 2), and, hence, the housing 36 through a corresponding angle, say plus or minus 30° from a vertical position of the wedge 34, represented by points B and C of FIGURE 4, at which time the edges 128 of the doors 32 will be rotated to positions represented by points D and E. The corresponding positions of the pocket 100 of the link 98 will be at points F and G of FIGURE 4, point H representing the location of the link 98 when the wedge 34 is in a vertical position.

From the above discussion, it is apparent that this combination of pitch and yaw control, along with roll control, the latter not being included as a part of this invention but provided for by roll control valves at the wing tips, will constitute a system whereby the pilot may maintain the aircraft in a perfectly level attitude while ascending or descending, and at the same time control the exact direction in which the aircraft is pointing.

It should also be apparent that the invention provides novel means for regulating the thrust required for pitch and yaw control by varying the size and positions of a pair of rectangular nozzles formed within the front and rear valves, in response to manual control of the pilot lever and the pilot foot pedal. Further, it is apparent that the control of the opening and closing of the doors is easy for the pilot to accomplish, due to the novel aerodynamic balancing technique which has been incorporated as a feature of the invention.

Although but one embodiment of the invention has been disclosed and described, it is apparent that other modifications of the invention may be made within the scope of the appended claims.

What we claim as our invention is:

1. In a vertical take-off and landing vehicle, a thrust reaction control valve, said valve comprising a rotatable housing having a chamber therein and an opening through a wall thereof, a wedge secured in said opening, a separate door rotatably mounted across said opening forming a nozzle with said wedge, first means for rotating said door to vary the size of said nozzle and second means for rotating said housing.

2. In a vertical take-off and landing vehicle, a thrust reaction control valve, said valve comprising a rotatable housing having a chamber therein and an opening through a wall thereof, a two-dimensional isentropic wedge fixedly secured in said opening, a pair of aerodynamically balanced doors rotatably mounted across said opening forming a nozzle with said wedge, first means for rotating said doors to vary the size of said nozzle and second means for rotating said housing.

3. In a vertical take-off and landing vehicle, a thrust reaction control valve, said valve comprising a rotatable housing having a chamber therein and an opening through a wall thereof, an isentropic wedge fixedly secured in said opening, an aerodynamically balanced door rotatably mounted across said opening forming a nozzle with said wedge, a first means for rotating said door to vary the size of said nozzle and second means for rotating said housing.

4. In a vertical take-off and landing vehicle having a pilot control lever, a thrust reaction control valve, said valve comprising a housing having a central chamber therein, an inlet and an outlet, a wedge secured in said outlet, a pivotable door located adjacent said wedge and forming a variable nozzle therewith, a balancing chamber formed behind said door, a variable depth orifice for communicating between said central chamber and said balancing chamber, the degree of communication being controlled by said pivotable door, a fixed opening through said door for communicating between said balancing chamber and said nozzle, and linkage means between said pilot control lever and said door.

5. The device described in claim 4 wherein said linkage means includes a shaft extending from and slidably connected to said housing, a linkage member operatively connecting said pilot control lever to said shaft, a member pivotally connected to said housing, a link fixedly secured to said member and operably connected to said shaft, and a lever pivotally connected to an end of said door and operably connected to said member.

6. In a vertical take-off and landing vehicle having a pilot control lever, a thrust reaction control valve, said valve comprising a housing having a central chamber therein, an inlet and an outlet, a two-dimensional wedge secured in said outlet, a pivotable door located adjacent each side of said wedge and forming a pair of variable nozzles therewith, a balancing chamber formed behind each of said doors, an orifice for communicating between said central chamber and each of said balancing chambers, the degree of communication being controlled by said pivotable doors, a fixed opening through each of said doors for communicating between said balancing chambers and said nozzles, linkage means between said pilot control lever and one of said doors, and means for rotating the other of said doors in a direction opposite to any movement of said one door.

7. The device described in claim 6 wherein said linkage means includes a first shaft extending from and slidably connected to said housing, a second shaft extending from and fixedly secured to one of said doors, a linkage member operatively connecting said pilot control lever to said first shaft, a member pivotally connected to said housing, a link fixedly secured to said member and operably connected to said first shaft, and a lever pivotally connected to an end of said second shaft and operably connected to said member.

8. In a vertical take-off and landing vehicle having a pilot control lever and a pilot foot pedal, a thrust reaction control valve, said valve comprising a stationary and a movable housing, said movable housing having a central chamber therein, an inlet and an outlet, a two-dimensional wedge secured in said outlet, a pivotable door located adjacent each side of said wedge and forming a pair of variable nozzles therewith, a balancing chamber formed behind each of said doors, an orifice for communicating between said central chamber and each of said balancing chambers, the degree of communication being controlled by said pivotable doors, a fixed opening through each of said doors for communicating between said balancing chambers and said nozzles, first linkage means between said pilot control lever and one of said doors, said first linkage means including a first shaft extending from and slidably connected to said stationary housing, a second shaft extending from and fixedly secured to one of said doors, a linkage member operatively connecting said pilot control lever to said first shaft, a member pivotally connected to said movable housing, a circumferential track fixedly secured to said first shaft between said stationary and said movable housings, a link fixedly secured to said member and slidably connected to said circumferential track, a lever pivotally connected to an end of said second shaft and operably connected to said member, means for rotating the other of said doors in a direction opposite to any movement of said one door, and second linkage means between said pilot foot pedal and said movable housing.

References Cited by the Examiner

UNITED STATES PATENTS

| | | | |
|---|---|---|---|
| 2,666,603 | 1/1954 | Horkey | 244—90 |
| 2,838,257 | 6/1958 | Webault | 244—52 X |
| 2,959,374 | 11/1960 | Laskowitz | 244—52 X |
| 3,111,289 | 11/1963 | Murphy | 244—52 |
| 3,155,342 | 11/1964 | Bokhow et al. | 244—52 X |
| 3,166,273 | 1/1965 | Balluff | 244—52 |

FOREIGN PATENTS 861,992 2/1941 France.

MILTON BUCHLER, *Primary Examiner.*

B. BELKIN, *Assistant Examiner.*